April 8, 1958     F. J. HUGHES ET AL     2,829,768
AUTOMATIC SORTING DEVICE

Filed Aug. 19, 1954     2 Sheets-Sheet 1

INVENTORS
FRANCIS J. HUGHES
ROBERT MC GHEE
BY
Michael Hertz
ATTORNEY

April 8, 1958 F. J. HUGHES ET AL 2,829,768
AUTOMATIC SORTING DEVICE
Filed Aug. 19, 1954 2 Sheets-Sheet 2
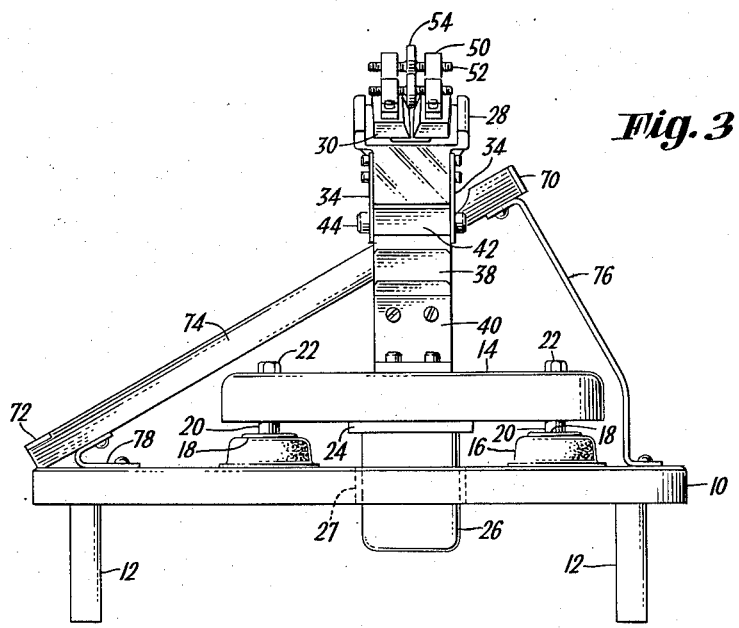
Fig. 3
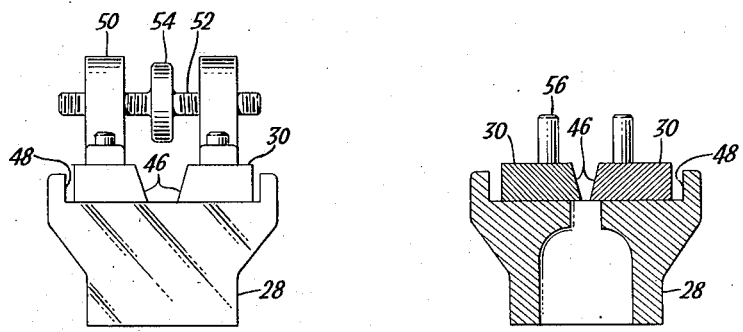
Fig. 4
Fig. 5
INVENTORS
FRANCIS J. HUGHES
ROBERT MC GHEE
BY
Michael Hertz
ATTORNEY

United States Patent Office 2,829,768
Patented Apr. 8, 1958

2,829,768
AUTOMATIC SORTING DEVICE

Francis J. Hughes, Levittown, and Robert McGhee, Massapequa Park, N. Y., assignors to Sylvania Electric Products Inc., a corporation of Massachusetts Application August 19, 1954, Serial No. 450,886

1 Claim. (Cl. 209—99)

This invention relates to apparatus for sorting objects in accordance with their size.

In particular, the invention relates to the sorting of electronic components such as cathode sleeves or grids according to their diameters.

According to a known method of sorting objects, there has been utilized a pair of downwardly inclined rails with the rails diverging from each other in the downward direction and these rails have been vibrated to expedite the downward movement of the objects therealong.

However, such a device is inefficient in sorting light fragile articles such as the cathode sleeves and grids mentioned above. When it is attempted to sort these articles with downwardly inclined divergent rails the articles crowd together, climb up on one another, and, in the case of grids, entangle with each other thereby interfering with proper sorting operation.

It is an object of this invention to provide a machine utilizing vibrating inclined rails wherein these undesirable actions will not occur, resulting in efficient assorting of articles.

Other objects will appear after reading the following specification in conjunction with the accompanying drawing in which:

Fig. 3 is a front elevational view of the machine with the hopper removed.

Fig. 4 is an end view of the rails and their adjusting means, and

Fig. 5 is a section on the line 5—5 of Fig. 2.

Figure 1:
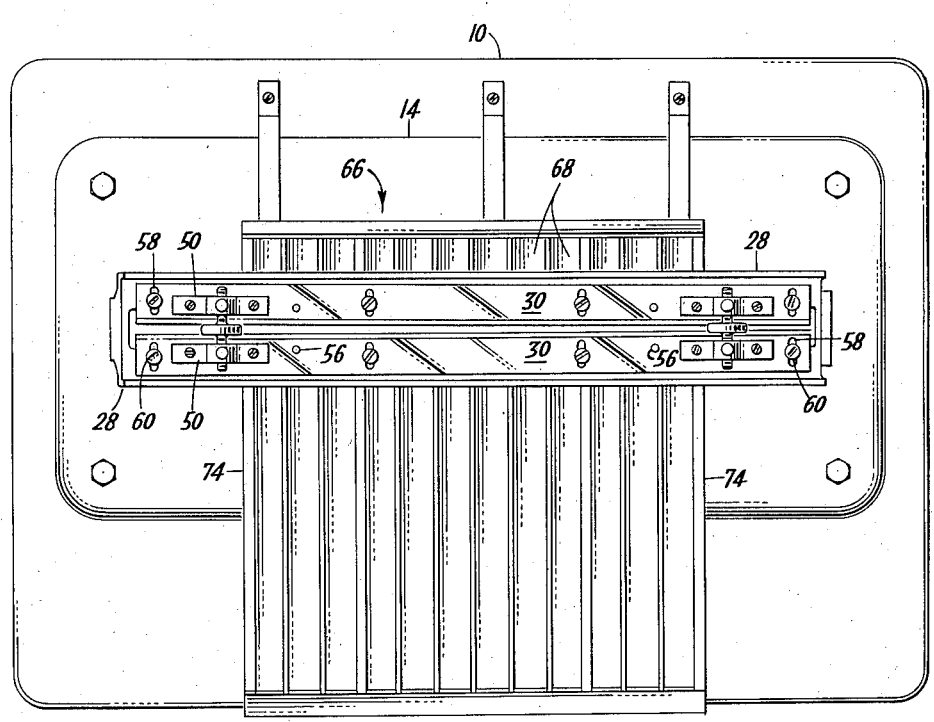
Fig. 1 is a top plan view of the sorting machine with a delivery hopper removed.

Referring to the drawings more in detail, at 10 is indicated a table top mounted on cleats 12.

Resiliently mounted on the table top is a base block 14 in the form of a casting, the block being supported by rubber grommets 16 via washers 18 and spacing collars 20. Lag screws 22 or bolts are passed through the block, collars, washers and grommets and into the table top 10 to hold the parts in assembled relationship. Secured to the undersurface of the block 14, as through the intermediary of a plate 24, is a vibrator 26 which conveniently may be of the electromagnetic type with means to vary the amplitude of vibration. This vibrator is freely movable in an opening 27 in the table top.

Mounted on the block is elongated, inclined, vertically slotted sleeper 28 supporting a pair of adjustable rails 30 along the upper surface of the elongated sleeper. At one end, the sleeper is provided with a hinge 32 and at the other end the sleeper is provided with a pair of slotted brackets 34. The hinged end of the sleeper is supported from the block 14 by a support leg 36, which, while it may be of rigid material, is preferably resilient in character. The leg is disclosed as made of spring leaves 38 fastened at one end to one of the leaves of the hinge and at the other end to an angle bracket 40 secured to the block 14. The other end of the sleeper is also supported by a leg, the upper end of which is provided with a block 42, a pair of screws 44 being threaded into the block and passing through the slots in the brackets to clamp the sleeper at any desired inclination.

Figure 2:
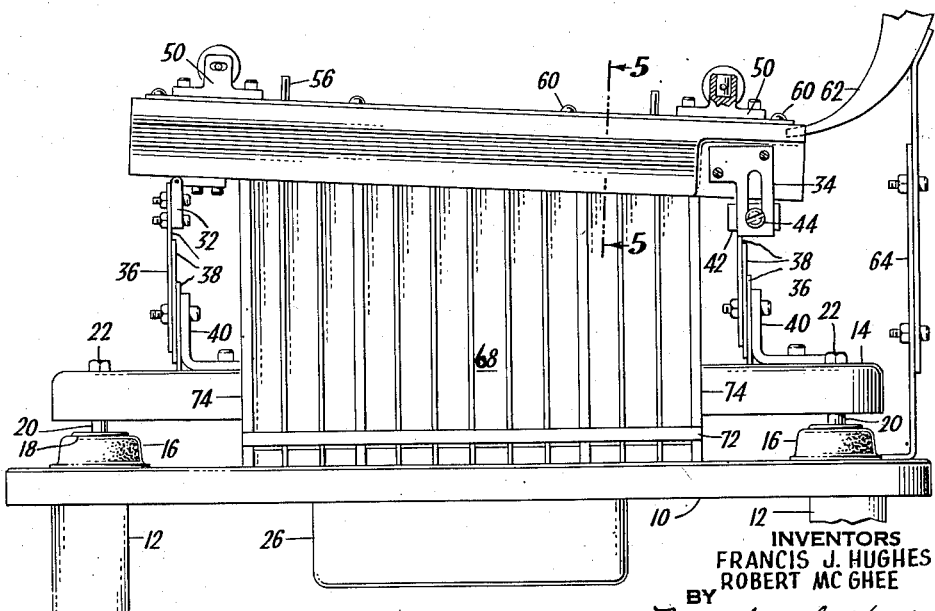
Fig. 2 is a side elevational view of the sorting machine, the hopper being shown fragmentarily.

Adjustably mounted on the sleeper are the diameter gauging rails or bars 30. These rails are each trapezoidal in cross section with opposing faces 46 converging downwardly to provide a trackway therebetween. The rails are adjustable to and from each other, being limited in their outward movement away from each other by the cheeks 48 on the sleeper and in their inward movement by abutment of the lower edges of the converging faces. To provide for adjustment of the rails, each end of the pair of rails is provided with a pair of upstanding pillow blocks 50, threadedly receiving an adjusting toggle bolt 52, each bolt having an integral central knurled adjusting nut 54. The two opposite halves of the bolt are threaded in opposite directions and are threaded into correspondingly threaded openings in the pillow blocks. Thus rotation of the toggle bolt in one direction will cause the ends of the rails adjacent the nut to approach each other and rotation of the nut in the opposite direction will cause the same ends to recede from one another, thus narrowing or widening the gap between rails. The nuts are so adjusted that the lower ends of the rails, those shown at the right in Figs. 1 and 2 are closer together than the upper ends shown at the left.

To assist in finely positioning the rails, each of them is provided with a pair of spaced gauge pins 56, the pins on one rail being opposed to the pins on the other rail. A micrometer or other measuring instrument may be placed across opposing pins to determine the displacement between the rails at the pins. To permit of adjustment of the rails and to lock them in adjusted position, each of them is provided with a number of cross slots 58 to enable the bars to slide along transversely of bolts 60 threaded into the sleeper and which may be tightened down to clamp the rails in adjusted position. A hopper 62, fragmentarily shown in Fig. 2, is flexibly supported by spring leaves 64 from the table 10, and has its spout in position to discharge articles in the hopper onto the lower end of the rails where the gap between the rails is narrowest.

When the vibrator is operated the motion thereof will be imparted to the spring leaves 38, setting them into vibration. The motion of the vibrator and springs will cause the rails to be oscillated in an arcuate path. The rails, therefore, will not only have a lateral component of motion but also a vertical component and will be set into such motion by means comprising the vibrator and the springs.

The frequency of the applied E. M. F. to the electric vibrator and the natural frequency of the sorting system are related to each other, and the mass of parts and tension of springs 38 are adjusted to give optimum results to advance the articles upwardly along the rails. The advance movement apparently occurs because when the rails are vibrated the articles are, by inertia effects, momentarily moving above the rail elevation. While the articles are elevated, the rails themselves shift laterally and the articles then fall on the rails at shifted positions longitudinally of the rails. The amplitude of vibration, controlled, for example, by varying the current applied to the vibrator, affects the movement of the articles along the rails and should be adjusted so that the movements of the articles are not too violent. With proper adjustment of parts, an article will glide expeditiously upwardly along the rails, and with very little vertical jiggling, until it finds the gap wide enough to allow the article to fall between the bars or rails and through the gap in the sleeper into a suitable receiver.

Arranged below the sleeper is a chute assembly 66 comprising a number of chutes 68 preferably of transparent material, such as Lucite, so that articles in the chutes may be observed. These chutes are in side by side relationship, arranged transversely of the trackway with their upper ends beneath the gap in the trackway and their lower ends discharging to any suitable compartmented vessel or the like. The upper and lower ends of the assembly have tie bars 70 and 72 suitably fastened as by cementing, to the separate chutes. Also, if desired, side frame bars such as 74 may be secured to the upper and lower tie bars. The upper end of the assembly is supported from the table by a number of struts 76, while the lower end is supported by a number of corner irons 78.

Obvious changes may be made in the construction of parts without departing from the spirit of the claimed subject matter appended hereto.

What we claim as new is:

A sorting machine for sorting articles in accordance with their thickness comprising a table, a block resiliently supported on said table, a vibrator secured to the under surface of said block to impart vibratory movement to the block, spaced elongated resilient means of such shape as to afford a predominantly lateral motion to the top of said resilient means upstanding from the block, a rail assembly carried on the block solely by being affixed to the upper ends of the resilient means, with the assembly inclined to the horizontal, the rails of the assembly diverging upwardly along the length of the assembly, and means for feeding articles whose thickness is to be gauged to the lower end of the pair of rails, the vibration of the block and the resilient means imparting to the rails components of motion which are both vertical and horizontal, whereby articles placed on the divergent rails on the lower end thereof will be advanced toward the upper more divergent ends of the rails and assorted out as they move therealong.

References Cited in the file of this patent

UNITED STATES PATENTS

| Number | Name | Date |
|---|---|---|
| 282,719 | Gunckel | Aug. 7, 1883 |
| 626,539 | Hathorn | June 6, 1899 |
| 1,105,427 | Hellfach | July 28, 1914 |
| 2,394,914 | Johnson | Feb. 12, 1946 |
| 2,501,403 | McKinsey | Mar. 21, 1950 |

FOREIGN PATENTS

| Number | Country | Date |
|---|---|---|
| 18,276 | France | Mar. 9, 1914 |
| 265,978 | Great Britain | Feb. 23, 1928 |
| 549,127 | Great Britain | Nov. 6, 1942 |
| 814,959 | Germany | Sept. 27, 1951 |
| 983,335 | France | Feb. 7, 1951 |